Patented Mar. 23, 1948

2,438,485

UNITED STATES PATENT OFFICE 2,438,485

FLUORINATED DIBASIC ACIDS AND METHOD OF PREPARING SAME

Albert L. Henne, Columbus, Ohio, assignor to Ohio State University Research Foundation, Columbus, Ohio, a corporation of Ohio No Drawing. Application October 4, 1946, Serial No. 701,083

3 Claims. (Cl. 260—537)

This application is in part a continuation of my copending application Serial No. 558,607, filed October 13, 1944.

This invention relates to fluorinated dibasic acids and to their preparation through the ring opening of fluorinated cyclo-olefins.

One of the objects of the invention is to provide a new compound consisting of a fluorinated dibasic acid.

Another more specific object is to provide a new compound consisting of fluorinated glutaric acid.

Another object of the invention is to provide a new compound consisting of hexafluoroglutaric acid or as it is sometimes called per-fluoroglutaric acid.

A further object is to provide a new compound consisting of tetrafluorosuccinic acid.

In carrying out the above objects it is a further object of the invention to provide a method of preparing said new compounds by the ring opening of a halogenated alicyclic olefin compound.

A more specific object is to provide a new process for the ring opening of hexafluorodichlorocyclopentene.

Further objects and advantages will be apparent from the following disclosure.

It has been discovered that fluorinated alicyclic olefin compounds can be opened by an alkaline oxidation reaction to form fluorinated dibasic acids.

One of these cyclic olefin derivatives namely hexafluorodichlorocyclopentene can be opened to form hexafluoroglutaric acid. The structural formula of the cyclopentene compound is as follows:

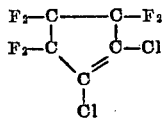

This compound is opened to form a perfluoroglutaric salt which is then treated with acid to form the desired hexafluoroglutaric acid.

Similarly tetrafluorosuccinic (tetrafluorobutanedioic) acid may be formed from perfluorinated cyclobutene ($C_4F_6$) or from dichlorotetrafluorocyclobutene ($C_4F_4Cl_2$).

EXAMPLE I

In preparing hexafluoroglutaric acid, .5 mole (123 gr.) of hexafluorodichlorocyclopentene is placed in a three necked flask, equipped with a sealed stirrer, six bulb reflux condenser and a dropping funnel, together with 105 gm. of potassium permanganate, 75 gm. of potassium hydroxide and 300 cc. of water. The flask and contents are heated in a water bath at a temperature sufficient to reflux the contents. The reflux is continued for about 12 hours whereupon the contents is steam distilled permitting recovery of about 22 gms. of the hexafluoride.

The reaction occurring during this procedure is:

$$3C_5F_6Cl_2 + 4KMnO_4 + 8KOH \rightarrow$$
$$3C_3F_6(CO_2K)_2 + 4MnO_2 + 6KCl + 4K_2O$$

This reaction mixture consisting of the potassium salt of perfluoroglutaric acid is then acidified with 210 cc. of concentrated sulfuric acid in 250 cc. of water. This causes a reaction whereby the desired perfluoroglutaric acid is formed with a reaction product of potassium sulfate. Sulfur dioxide is then bubbled through the solution to reduce all the manganese dioxide whereupon the hexa or perfluoroglutaric acid can be continuously extracted from the mixture with ether.

Distillation of the extract will yield about 246 gms. of the white crystalline acid with a melting point of 78–88° C., a boiling point of 134–138° C./3 mm. and a molecular weight of 239 (240 theoretical). The acid is very hygroscopic, is soluble in acetone and insoluble in benzene and has a formula of $C_3F_6(COOH)_2$.

EXAMPLE II

Oxidation of $CF_2—CF=CF—CF_2$ (Run 1): In a one-liter-three-necked flask fitted with a motor driven stirrer, a reflux condenser connected in series with a dry ice cooled receiver, and an inlet tube extending to the bottom of the flask, were placed 67.5 gms. of potassium permanganate, 47 gms. of potassium hydroxide, and 300 cc. of water. The flask was placed on a steam bath. Through the hot solution 51 gms. (0.314 mole) of

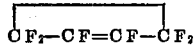

was slowly bubbled. The material which did not react was collected in the dry ice cooled receiver and weighed 50 gms. The reaction mixture was cooled and the 50 gms. of recovered $C_4F_6$ was rebubbled through it. This time, 42 gms. of unreacted material was recovered. The reflux condenser was cooled to −20° C. by pumping dry ice cooled alcohol through it. The 42 gms. of recovered $C_4F_6$ was bubbled through the oxidizing solution and a vigorous refluxing was obtained. After four hours, the condenser was warmed to room temperature. The unreacted material weighed 22 gms. The reaction mixture was treated in the usual manner with sulfur dioxide and sulfuric acid. A continuous ether extraction was used to recover the acid. After stripping off the ether, a small amount of residue remained which would not crystallize at dry ice temperature. Distillation from a 25 cc. modified Claisen flask yielded 4.5 gms. of white crystalline acid B. P. 150° C./15 mm. Its neutral equivalent was 94.5; theoretical for $(CF_2)_2(COOH)_2$ is 95. The yield was 12%.

(Run 2): In a 1500 cc. steel bomb fitted with a 300 pound pressure gauge and a needle valve were placed 149 gms. (2.66 moles) of potassium hydroxide, 210 gms. (1.33 moles) of potassium permanganate, 500 cc. of water and 120 gms. (0.742 moles) of $C_4F_6$. The bomb was cooled with dry ice before the addition of the $C_4F_6$. The bomb was then placed on a shaker for 10 hours. During this time, the exothermic reaction caused the bomb to become quite hot and the pressure rose to 75 p. s. i.

After cooling the bomb, the reaction mixture was treated in the usual manner. Distillation of the product through a modified Claisen flask yielded 48 gms. of the acid, $(CF_2)_2(COOH)_2$, B. P. 150° C./15 mm.; corresponding to a 37% conversion.

EXAMPLE III

*Oxidation of cyclo $C_4F_4Cl_2$ to*
*$HO_2C$—$CF_2$—$CF_2$—$CO_2H$*

Cyclo $C_4F_4Cl_2$ (22.9 gms., 0.117 mole) was placed in a 250 cc., 3 neck flask equipped with an efficient stirrer and a reflux condenser, connected to a dry ice-acetone cooled trap. $KMnO_4$ (27 gms., 0.17 mole) was added in five portions over a period of two hours, taking care to keep the mixture on the alkaline side by means of 19 gms. of potassium hydroxide. The reaction was stirred and heated until organic reflux was no longer visible. The potassium salts were dissolved in water and the $MnO_2$ removed by filtration. The excess $KMnO_4$ was then destroyed by means of a stream of $SO_2$ and the solution filtered again. Titration of an aliquot of the water solution, with standard silver nitrate, indicated a 90% reaction. The water solution was acidified with HCl until just alkaline to litmus, and evaporated to dryness. The salt was then acidified with 98% sulfuric acid and the organic acid extracted with five 100 cc. portions of diethyl ether. Distillation gave a 65% conversion to $HO_2C$—$CF_2$—$CF_2$—$CO_2H$; B. P. 148–150° C./16 mm.; M. P. 86.4–87.4° C.; neutral equivalent found 94.8, calculated 95.0.

From the foregoing it is apparent that I have discovered new compounds together with a method of preparing said compounds. It is also manifest that other dibasic acids may be prepared from other fluorinated cyclic olefins by a similar procedure which is apparent to anyone skilled in the art. It is also to be understood that if the alkaline salts of the dibasic acids are desired that these may be extracted prior to addition of the acid.

While the embodiment of the present invention as herein disclosed, constitutes a preferred form, it is to be understood that other forms might be adopted, all coming within the scope of the claims which follow.

I claim:

1. A method of preparing tetrafluorosuccinic acid which comprises the steps of breaking the ring of tetrafluorodichlorocyclobutane by oxidation in an alkaline solution for forming an alkaline salt of tetrafluorosuccinic acid, adding an acid in sufficient quantities to react with the alkaline metal of said salt whereby tetrafluorosuccinic acid is formed in solution, and then extracting the tetrafluorosuccinic acid from said solution.

2. A method of preparing tetrafluorosuccinic acid comprising the steps of; breaking the ring of hexafluorocyclobutane by oxidation in an alkaline solution for forming an alkaline salt of tetrafluorosuccinic acid, adding an acid in sufficient quantities to react with the alkaline metal of said salt whereby tetrafluorosuccinic acid is formed in solution, and then extracting the tetrafluorosuccinic acid from said solution.

3. A method of preparing a fluorinated dibasic acid, comprising the steps of; providing a fluorinated alicyclic olefin, having a structural formula of

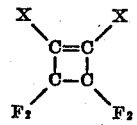

wherein X represents a halogen atom selected from the class consisting of fluorine and chlorine, oxidizing said olefin in an alkaline solution to open the ring and thereby form a salt of a fluorinated dibasic acid; reacting said salt with an acid to form a fluorinated dibasic acid in solution; and finally extracting the fluorinated dibasic acid from the solution.

ALBERT L. HENNE.

REFERENCES CITED

The following references are of record in the file of this patent:

UNITED STATES PATENTS

| Number | Name | Date |
|---|---|---|
| 2,426,224 | Kharasch | Aug. 26, 1947 |

OTHER REFERENCES

Henne et al., Journal of the American Chemical Society, August 9, 1945, vol. 67, pages 1235–1237.